(12) United States Patent
Gvd et al.

(10) Patent No.: US 11,526,790 B2
(45) Date of Patent: Dec. 13, 2022

(54) UNIVARIATE ANOMALY DETECTION IN A SENSOR NETWORK

(71) Applicant: Oracle International Corporation, Redwood Shores, CA (US)

(72) Inventors: Karthik Gvd, Bengaluru (IN); Utkarsh Milind Desai, Bangalore (IN); Vijayalakshmi Krishnamurthy, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 669 days.

(21) Appl. No.: 16/585,764

(22) Filed: Sep. 27, 2019

(65) Prior Publication Data

US 2021/0097416 A1 Apr. 1, 2021

(51) Int. Cl.
| | |
|---|---|
| *G01D 3/08* | (2006.01) |
| *G06N 7/00* | (2006.01) |
| *G06K 9/62* | (2022.01) |
| *H04W 84/18* | (2009.01) |
| *G06F 17/13* | (2006.01) |
| *G01D 21/00* | (2006.01) |

(52) U.S. Cl.
CPC .............. *G06N 7/005* (2013.01); *G01D 21/00* (2013.01); *G06F 17/13* (2013.01); *G06K 9/6277* (2013.01); *H04W 84/18* (2013.01)

(58) Field of Classification Search
CPC ........ G06N 7/005; G06N 20/10; G06F 17/13; G06F 17/18; G06K 9/6277; G01D 21/00; G01D 3/08; H04W 84/18
See application file for complete search history.

(56) References Cited

U.S. PATENT DOCUMENTS

| 9,160,760 B2 | 10/2015 | Vasseur et al. |
|---|---|---|
| 2010/0012161 A1 | 1/2010 | Classen et al. |
| | (Continued) | |

FOREIGN PATENT DOCUMENTS

| CN | 101295177 B | 8/2010 |
|---|---|---|
| CN | 110967690 A | 4/2020 |
| | (Continued) | |

OTHER PUBLICATIONS

Xie et al., Distributed Segment-Based Anomaly Detection with Kullback-Leibler Divergence in Wireless Sensor Networks, Jan. 2017, IEEE Transactions on Information Forensics and Security, vol. 12, No. 1, pp. 101-110 (Year: 2017).*

(Continued)

*Primary Examiner* — Toan M Le
(74) *Attorney, Agent, or Firm* — Potomac Law Group, PLLC

(57) ABSTRACT

Embodiments determine anomalies in sensor data generated by a sensor by receiving an evaluation time window of clean sensor data generated by the sensor. Embodiments receive a threshold value for determining anomalies. When the clean sensor data has a cyclic pattern, embodiments divide the evaluation time window into a plurality of segments of equal length, wherein each equal length comprises the cyclic pattern. When the clean sensor data does not have the cyclic pattern, embodiments divide the evaluation time window into a pre-defined number of plurality of segments of equal length. Embodiments convert the evaluation time window and each of the plurality of segments into corresponding curves using Kernel Density Estimation ("KDE"). For each of the plurality of segments, embodiments determine a Kullback-Leibler ("KL") divergence value between corresponding curves of the segment and the evaluation time window to generate a plurality of KL divergence values.

20 Claims, 7 Drawing Sheets

(56) References Cited

U.S. PATENT DOCUMENTS

| | | |
|---|---|---|
| 2012/0166142 A1 | 6/2012 | Maeda et al. |
| 2013/0318011 A1 | 11/2013 | Jones et al. |
| 2015/0189068 A1 | 7/2015 | Mohan et al. |
| 2015/0223309 A1 | 8/2015 | Mohan et al. |
| 2016/0004237 A1 | 1/2016 | Mohan et al. |
| 2016/0217378 A1 | 7/2016 | Bellala et al. |
| 2016/0285913 A1 | 9/2016 | Itskin et al. |
| 2016/0328253 A1 | 11/2016 | Majumdar |
| 2016/0356633 A1 | 12/2016 | Mohan et al. |
| 2017/0177812 A1 | 6/2017 | Sjölund |
| 2018/0039555 A1 | 2/2018 | Salunke et al. |
| 2018/0177415 A1 | 6/2018 | Madl |
| 2018/0211176 A1 | 7/2018 | Khurshudov et al. |
| 2018/0268264 A1 | 9/2018 | Marwah et al. |
| 2018/0365136 A1 | 12/2018 | Kumar et al. |
| 2019/0138423 A1 | 5/2019 | Agerstam et al. |
| 2020/0050825 A1 | 2/2020 | Mendoza-Schrock |
| 2021/0095996 A1 | 4/2021 | Gvd et al. |

FOREIGN PATENT DOCUMENTS

| | | |
|---|---|---|
| WO | 2009046185 A2 | 4/2009 |
| WO | 2018025008 A1 | 2/2018 |

OTHER PUBLICATIONS

Andrea Giantomassi, Electric Motor Fault Detection and Diagnosis by Kernel Density Estimation and Kullback-Leibler Divergence based on Stator Current Measurements, 11 pages, printed Mar. 4, 2021 (Year: 2021).

Bjorn Barz, Detecting Regions of Maximal Divergence for Spatio-Temporal Anomaly Detection, May 2019, 14 pages (Year: 2019).

Harrou, Kullback-Leibler distance-based enhanced detection of incipient anomalies, Aug. 31, 2016, 15 pages (Year: 2016).

Hiroaki Sasaki, Direct Density-Derivative Estimation and Its Application in KL-Divergence Approximation, 12 pages, Jun. 30, 2014 (Year: 2014).

Kevin R. Moon, Ensemble Estimation of Information Divergence, 39 pages, 2018 (Year: 2018).

Kim et al., Robust Kernel Density Estimation, 2012, 37 Pages (Year: 2012).

Cao et al., "SOMKE: Kernel Density Estimation Over Datastreams by Sequences of Self-Organizing Maps", IEEE Transactions on Neural Networks and Learning Systems, vol. 23, No. 8, Aug. 2012, http://www.bme.ele.uri.edu/faculty/he/PDFfiles/somke.pdf.

Filippone et al., "Information Theoretic Novelty Detection", Technical Report CS-09-02, Feb. 2009, pp. 1-23, http://www.dcs.gla.ac.uk/~maurizio/Publications/tech_rep_info_theo09.pdf.

Noriega et al., "Quantitative analysis of timing in animal vocal sequences", Feb. 21, 2019, pp. 1.23https://arxiv.org/pdf/1902.07650.pdf.

Xie et al., "Distributed Segment-Based Anomaly Detection With Kullback-Leibler Divergence in Wireless Sensor Networks", https://www.researchgate.net/publication/307438982_Distributed_Segment-Based_Anomaly_Detection_With_Kullback-Leibler_Divergence_in_Wireless_Sensor_Networks, last downloaded Apr. 12, 2019.

* cited by examiner

UNIVARIATE ANOMALY DETECTION IN A SENSOR NETWORK

FIELD

One embodiment is directed generally to anomaly detection, and in particular to anomaly detection in a sensor network.

BACKGROUND INFORMATION

The Internet of Things ("IoT") is the extension of Internet connectivity into physical devices and everyday objects. Embedded with electronics, Internet connectivity, and sensors, these devices can communicate and interact with others over the Internet, and they can be remotely monitored and controlled.

However, within the IoT, anomaly in measurements of sensors may occur due to sensor failure, abnormal changes of the monitored assets or environments, etc. As the number of devices that may be connected exceeds millions or even billions, accurate and efficient anomaly detection of the sensors becomes increasingly important.

SUMMARY

Embodiments determine anomalies in sensor data generated by a sensor by receiving an evaluation time window of clean sensor data generated by the sensor, the clean sensor data including anomaly free data as a plurality of data points. Embodiments receive a threshold value for determining anomalies. When the clean sensor data has a cyclic pattern, embodiments divide the evaluation time window into a plurality of segments of equal length, wherein each equal length comprises the cyclic pattern. When the clean sensor data does not have the cyclic pattern, embodiments divide the evaluation time window into a pre-defined number of plurality of segments of equal length. Embodiments convert the evaluation time window and each of the plurality of segments into corresponding curves using Kernel Density Estimation ("KDE"). For each of the plurality of segments, embodiments determine a Kullback-Leibler ("KL") divergence value between corresponding curves of the segment and the evaluation time window to generate a plurality of KL divergence values. Embodiments determine an amount of the plurality of segments that have a KL divergence value less than the threshold value. When the amount is less than a pre-defined percentage of the plurality of segments, embodiments reduce a number of segments to increase a number of data points in each segment.

BRIEF DESCRIPTION OF THE DRAWINGS

FIG. 7A is a graph illustrating a cyclic pattern of the input data, while

DETAILED DESCRIPTION

Embodiments provide anomaly detection in a sensor network using Kernel Density Estimation ("KDE") in combination with Kullback-Leibler ("KL") divergence. Embodiments calculate a threshold KL divergence value in a manner to generate an accurate anomaly detection performance. Embodiments then further determine a minimum window size of incoming data points that can optimize accurate detection using the threshold value.

Figure 1:
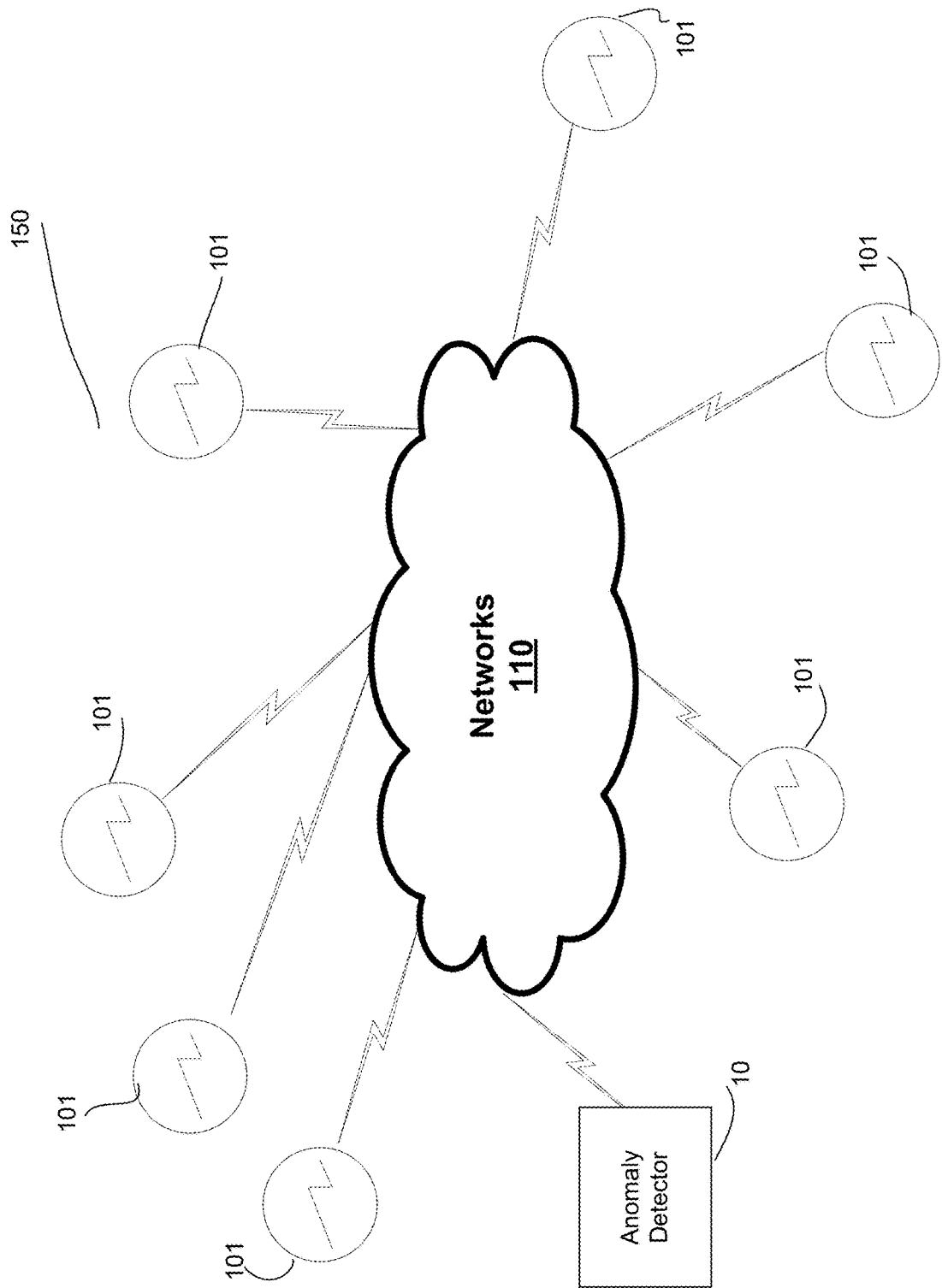
FIG. 1 is an overview diagram of elements of an anomaly detection network/system that can implement embodiments of the invention.

FIG. 1 is an overview diagram of elements of an anomaly detection network/system 150 that can implement embodiments of the invention. Sensor based network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101 (millions or billions of sensors, for example).

An IoT device can be any device that has a sensor attached to it and can transmit data from one object to another or to people with the help of Internet. IoT devices include wireless sensors, software, actuators, and computer devices. They are attached to a particular object that operates through the internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

Network 150 may be used for a variety of purposes, such as, for example, in the transportation industry, where vehicle fleet management is aided by the continuous acquisition of data by sensors that are attached to vehicles. In this embodiment, sensor network 150 may acquire data that may be monitored and processed for such purposes as aiding vehicle maintenance, optimizing vehicle routes, promoting driver safety, etc. As another example, sensor network 150 may be used in a smart building, where sensors 101 measure such parameters as air temperature, humidity, building occupancy, lighting, etc., for purposes of managing heating, ventilation, air conditioning and lighting systems and optimizing the use of resources, such as electricity, gas and water. As yet another example, sensor network 150 may be used in a utility infrastructure, where sensors 101 acquire data that monitor power, water, and so forth for efficient resource management.

Each of sensors 101 communicate, wirelessly or wired, through one or more networks 110. Networks 110 include the Internet, but may also include private on-premise networks that ultimately interface with the Internet as well as any other type of network that allows sensors 101 to communicate.

An anomaly detector 10 is coupled to networks 110 to send and receive data from sensors 101. Anomaly detector 10 provides the anomaly detection functionality disclosed herein. In general, anomaly detector 10 monitors data acquired by each of sensors 101 for purposes of detecting outliers, or anomalies, in that sensor's data. A given sensor 101 may provide anomalous data due to errant operation of the sensor such as from the failure of a sensor 101, the impending failure of a sensor 101, an errant operation of a sensor 101 due to for example, a misconfiguration or malicious activity, when a condition (e.g., temperature) exceeds a predetermined threshold, etc.

Sensors 101 can be largely dispersed geographically, such as with temperature sensors located throughout the world, or more locally dispersed. For example, a machine can be fitted with sensors 101 to monitor its operation. These sensors measure quantities such as temperature, pressure, and vibration amplitude for the different parts of the machine. If there is some malfunction or any other abnormality, some of these readings will deviate significantly from the norm. For example, it may be the case that a small part of the engine is overheated when compared to the rest of the engine, or that the entire engine is overheated when compared to the rest of the machine.

Figure 2:
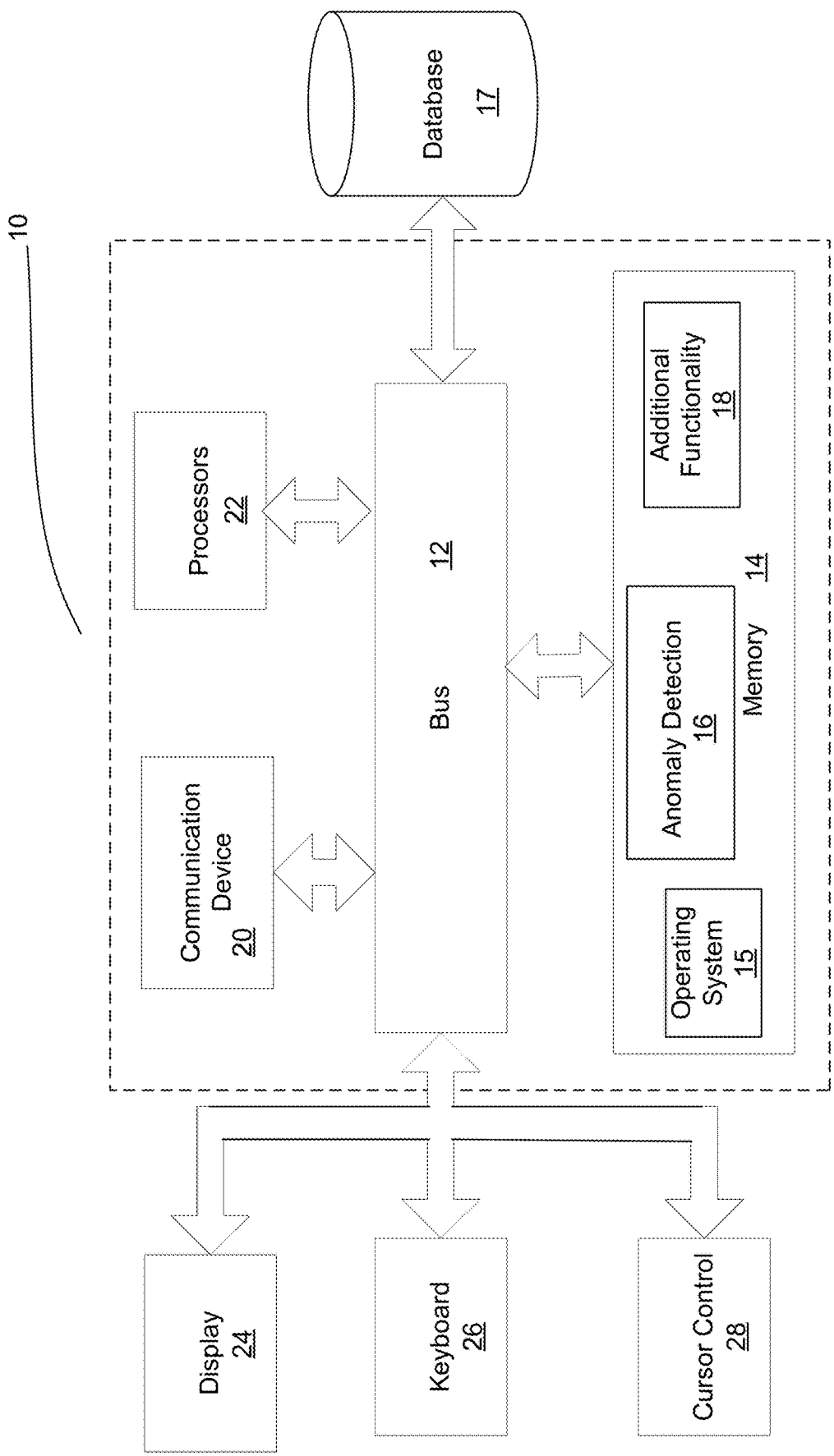
FIG. 2 is a block diagram of the anomaly detector of FIG. 1 in the form of a computer server/system in accordance with an embodiment of the present invention.

FIG. 2 is a block diagram of anomaly detector 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an anomaly detection module 16 that detects anomalies in a network of sensors, and all other functionality disclosed herein. System 10 can be part of a larger system. Therefore, system 10 can include one or more additional functional modules 18 to include the additional functionality, such as the "IoT Asset Monitoring Cloud Service" from Oracle Corp. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As discussed, in the IoT environment, advances in processor technologies and wireless communications have enabled the deployment of small, low cost and power efficient sensors. Anomaly detection involves monitoring the physical environment and highlighting events of interest as well as detecting problems in the sensor network. However, IoT sensors have limited resource capabilities, and the large amount of incoming different streams of data need to be examined dynamically.

Embodiments, in general, use a flexible data distribution approximation framework that does not require a priori knowledge about the input distribution. Based on the data distribution, embodiments efficiently provide deviation detection in sensor network 150 through determining a threshold and an evaluation window (i.e., for the identified threshold, how many minimum points should be used when identifying anomalies at runtime). Embodiments identify, among all the sensor readings in an evaluation window, those values that have very few near neighbors. This problem is especially important in the sensor network setting because it can be used to identify faulty sensors, and to filter spurious reports from different sensors. Even if the quality of measurements reported by the sensors is not faulty, the identification of outliers provides an efficient way to focus on the interesting events in the sensor network.

In general, embodiments identify anomalies on time series data generated by each of sensors 101. Kernel Density Estimation ("KDE") in combination with Kullback-Leibler ("KL") divergence is used. In one embodiment, a threshold KL divergence value is calculated. Once the threshold value is calculated, embodiments determine the minimum scoring/evaluation window size that can be used in determining anomalies.

Figure 3:
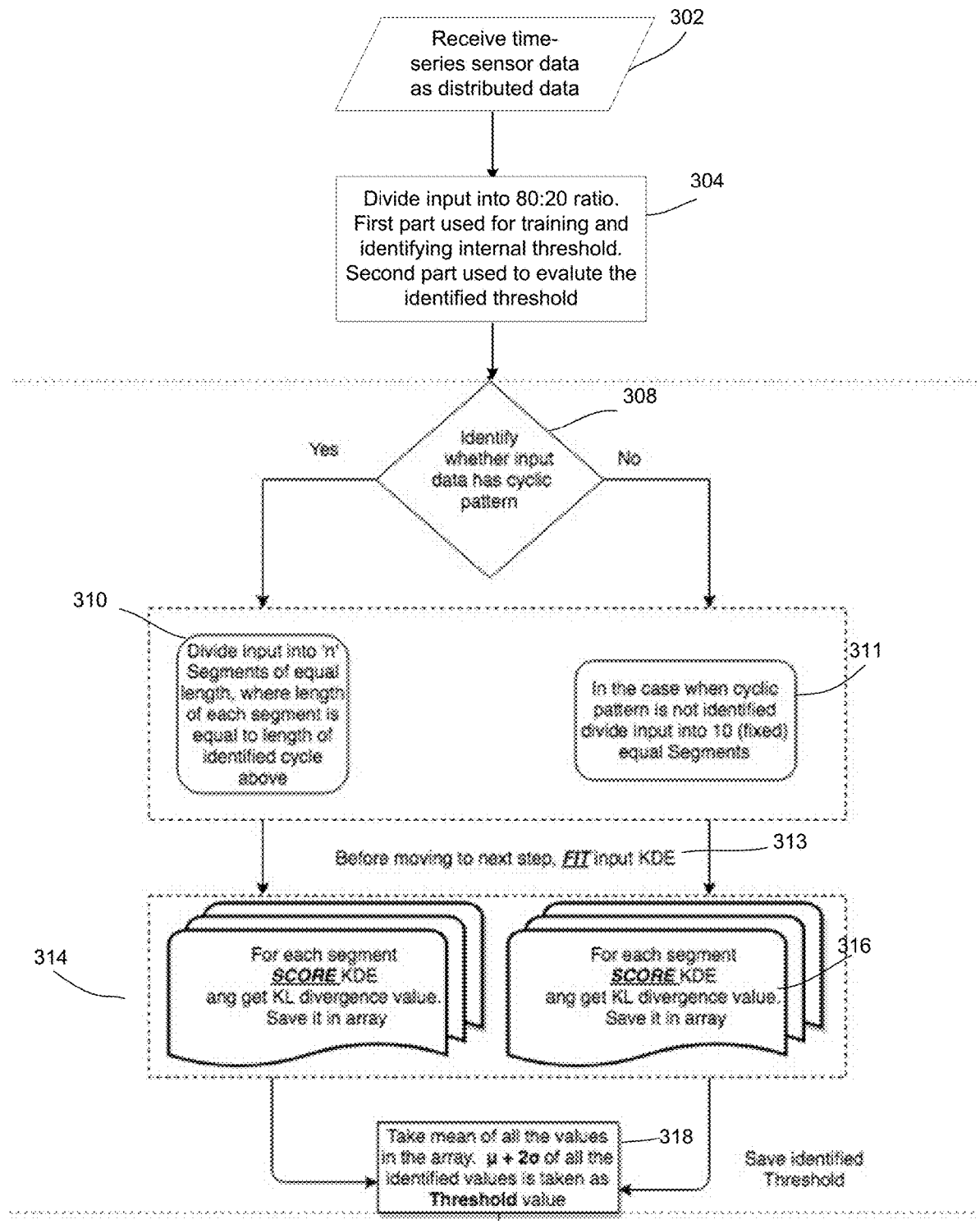
FIG. 3 is a flow diagram of the functionality of the anomaly detection module of FIG. 2 for determining a threshold when detecting anomalies in a sensor network in accordance with one embodiment.

FIG. 3 is a flow diagram of the functionality of anomaly detection module 16 of FIG. 2 for determining a threshold when detecting anomalies in a sensor network in accordance with one embodiment. The functionality disclosed herein is on a per sensor basis (i.e., univariate). In one embodiment, the functionality of the flow diagram of FIG. 3 (and FIGS. 4 and 5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, the data is received from sensors 101. The data is time-series data in the form of messages or data points that are sent on a fixed time schedule from each sensor 101, although different sensors have different frequencies at which the messages are sent. For example, each sensor can send a data point every minute or every hour. In one embodiment, a single sensor 101 generates a data point/message every 10 seconds, so over a four day period 34,560 points will be generated. For example, if sensors 101 are temperature sensors, they are generating data points that represent temperature, and a new temperature reading is generated every 10 seconds which causes an associated message to be sent from that sensor.

Figure 6:
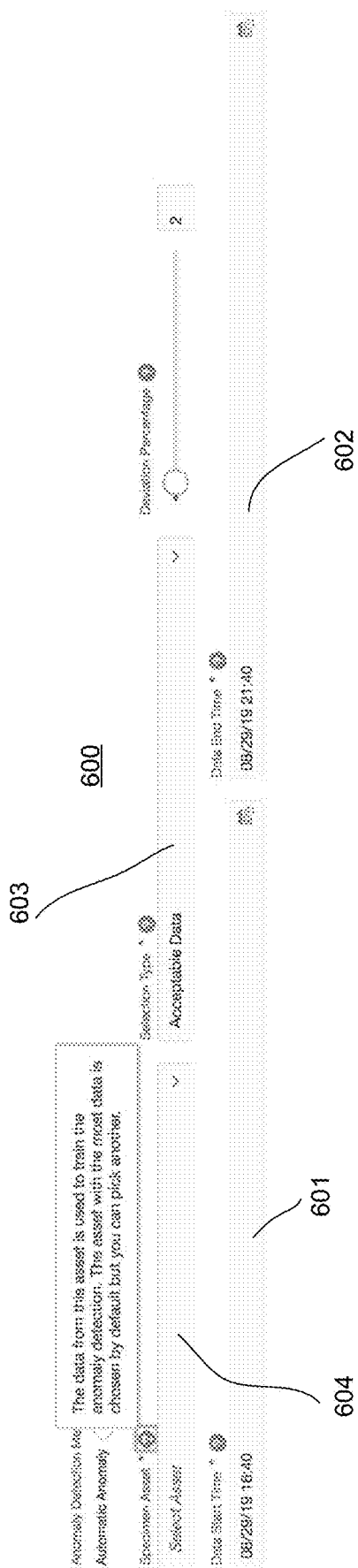
FIG. 6 illustrates a screenshot of a user interface for receiving data in accordance with embodiments.

It is assumed in embodiments that the input data at 302 that is used to determine a threshold value is anomaly-free (i.e., "clean" data). Clean data or anomaly-free data, in general, means that all of the data points reflect the expected behavior of the respective sensor, and does not include any unexpected behavior. In embodiments, a user interface ("UI") is provided to allow a user to specify the input data. FIG. 6 illustrates a screenshot of a user interface 600 for receiving data at 302 in accordance with embodiments. At 604, the asset (i.e., a particular sensor) is selected. At 603, the type of data is selected, which for 302 is "acceptable data" (i.e., anomaly-free data) because it is assumed that the sensor is behaving properly during this timeframe. At 601 and 602, the start time and end time of the collected data is specified. For example, four days of anomaly-free data from a temperature sensor can be specified on UI 600.

At 304, the data points are divided into an 80:20 ratio, or some other predetermined ratio. The 80% of the data is used to calculate the threshold value. The remaining 20% of the data is used to evaluate the calculated threshold value, as disclosed below in conjunction with FIG. 4. In one embodiment, since the data is ordered by time, the first 80% of the data points is selected as the 80% (i.e., not randomly selected), in order to preserve the temporal aspect of the data, and the last 20% is used to determine the evaluation window.

Figure 7A:
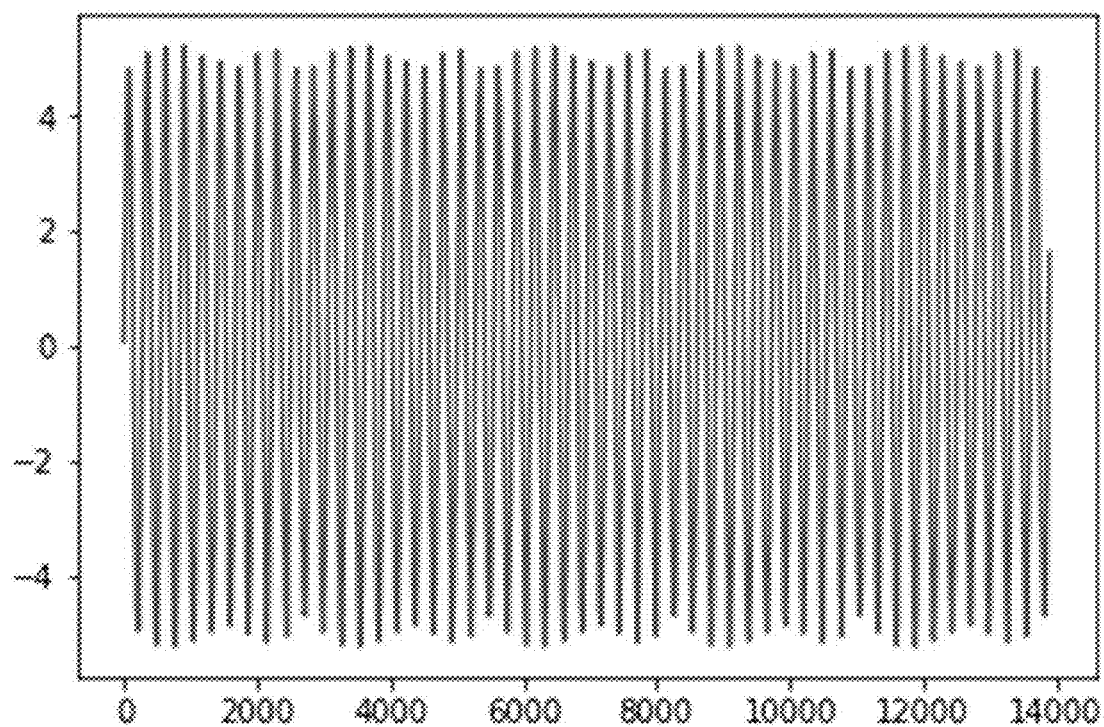
Figure 7B:
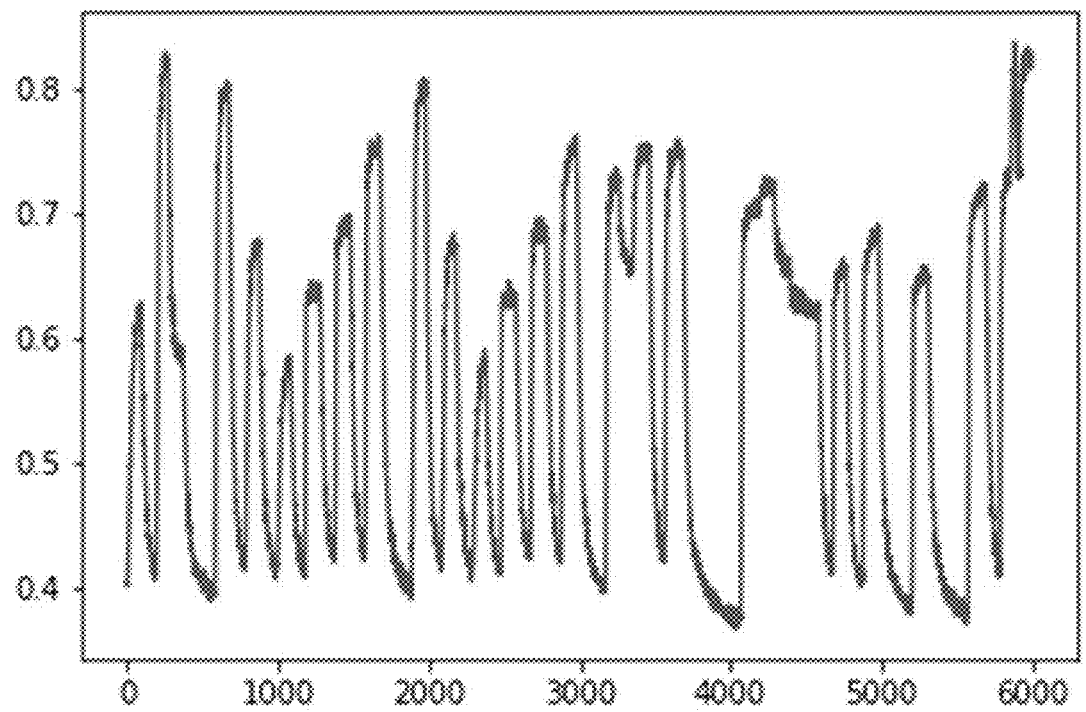
FIG. 7B is a graph illustrating a non-cyclic or acyclic pattern of the input data in accordance to embodiments.

At 308, it is determined if the input data has a cyclic pattern, such as a sine wave, or is non-cyclic. For example, FIG. 7A is a graph illustrating a cyclic pattern of the input data from 302, while FIG. 7B is a graph illustrating a non-cyclic or acyclic pattern of the input data from 302 in accordance to embodiments. Both FIGS. 7A and 7B illustrate the distribution of the data points as KDE curves after the KDE functionality disclosed below. A Pearson correlation is used to determine whether the pattern is cyclical in one embodiment as follows:

$$\rho = cov(x,y)/\sigma_x \sigma_y$$

where coy is the covariance, $\sigma_x$ is the standard deviation of X, and $\sigma_Y$ is the standard deviation of Y.

If a cyclic pattern exists at 308, then the length of the cycle is saved. For example, in FIG. 7A, the length may be every 2,000 points (as shown in the X axis), where 2,000 points represents ½ of a day's worth of data messages from a single sensor 101.

If the input data has a cyclic pattern at 308, then at 310 the input is divided into "n" equal segments, where the length of each segment is equal to the length of the cycle. For example, for FIG. 7A, if the length of each segment is 2,000 points, it is divided into seven segments out of the total of 14,000 points.

If the input data does not have a cyclic pattern at 308, then at 311 the input is divided into 10 (or some other predefined number) of equal segments.

At 313, the input 80% data points and the data points that form each of the segments is converted into a mathematical curve using KDE. KDE is a non-parametric way to estimate the probability density function of a random variable and is efficient to compute and maintain in a streaming environment. In one embodiment, the curve using KDE is calculated as follows:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right),$$

where K is the kernel (i.e., a non-negative function) and h>0 is a smoothing parameter referred to as the bandwidth. The kernel function used in embodiments is the following Gaussian function:

$$K(u) = \frac{1}{\sqrt{2\pi}} e^{-\frac{1}{2}u^2}$$

Further, at 313 each of the KDE curves is "fit". FIT functionality fits the input data as a distribution and includes drawing samples for this input by "Monte Carlo sampling" using as input of the 80% of the data point that were converted to a curve using KDE with a Gaussian Kernel. This sampling is required in some embodiments to approximate KL divergence between two distributions. In one embodiments, 10,000 samples are used using the below pseudo-code to draw samples:

```
def __sample_from_gaussian(self, u, v):
    """
    Returns a random sample from a Gaussian distribution with mean u and variance v
    """
    if self.__dimensions == 1:
        return np.random.normal(loc=u, scale=np.sqrt(v))
    else:
        if self.__q_mat is None:
            eigvec, eigval = np.eig(self.__bandwidth)
            self.__q_mat = np.sqrt(eigval) * eigvec
        random_vector = np.random.randn(self.__dimensions).reshape(-1, 1)
        sample = self.__q_mat * random_vector + u.reshape(-1, 1)
        return sample.reshape(1, -1)
```

At both 314 and 316, a "score" is obtained for each of the KDE curves for each segment, in comparison to the 80% KDE curve, meaning obtaining a KL divergence value (i.e., the input to the score is two KDE curves, the 80% training curve and the segment of interest curve). A score in general calculates a KL divergence value with the input received as part of scoring, compared with the distribution that fits as part of "FIT", and the approximation is done using each of the 10,000 samples by determining the probability of each sample in each of the two curves. The return value of this step is the KL divergence value. The KL divergence value is saved for each segment. The KL divergence value is a measure of difference between two distribution curves and can range from 1 to infinity. The outcome of 314 and 316 is a numerical score of the KL divergence value of each of the segments compared to the entire 80% training curve.

In one embodiment, the KL divergence value, for continuous probability distributions such as with sensor messages, for distributions P and Q of a continuous random variables, the following equation can be used:

$$D_{KL}(P\|Q) = \int_{-\infty}^{\infty} p(x)\log\left(\frac{p(x)}{q(x)}\right)dx$$

where ρ and q denote the probability densities of P and Q using each of the 10,000 points.

At 318, using all of the identified KL divergence values for each of the segments, the threshold value is determined by first calculating the mean and standard deviation, and then:

Threshold value=mean+2*(standard deviation).

The threshold value can be between 0 and infinity (because the KL divergence value is between 1 and infinity). For cyclic data at 310, the threshold value in examples will typically be between 0 and 1. For non-cyclic data at 311, the threshold value in examples can typically be as high as 150-200. Once the threshold value is obtained, anomalies can be detected in new incoming windows of sensor data. For example, a two minute window of new data can be obtained. As disclosed in more details below, the new data is converted into a curve using KDE and compared to the 80% data curve using KL divergence. The resulting value is compared to the threshold value and if it is above the threshold value then embodiments determine that there is anomalous behavior within the time window. A single anomalous data point within the window is not identified. If the value is below the threshold, then the new data is free from anomalies.

Figure 4:
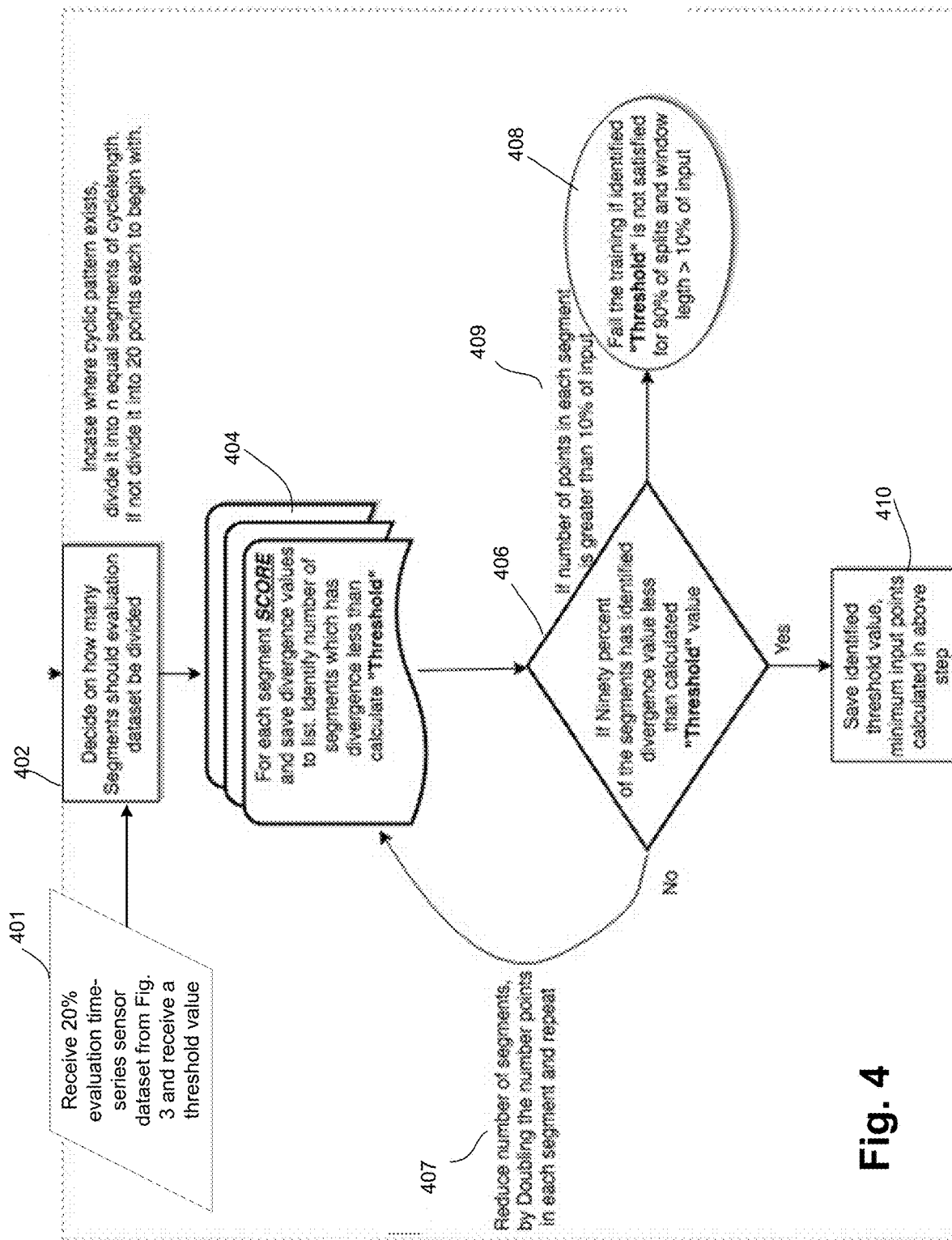
FIG. 4 is a flow diagram of the functionality of the anomaly detection module of FIG. 2 for determining a minimum window size for a specific threshold when detecting anomalies in a sensor network in accordance with one embodiment.

FIG. 4 is a flow diagram of the functionality of anomaly detection module 16 of FIG. 2 for determining a minimum window size for a specific threshold when detecting anomalies in a sensor network in accordance with one embodiment. In embodiments, the specific threshold is the threshold that is calculated using the functionality of FIG. 3. However, the threshold can be input from any other source as long as it is a KL divergence value.

Embodiments can have a present time window for which anomalies need to be checked. For example, for a single sensor 101 that generates a data point/message every 10 seconds, the window may be two minutes. In other words, embodiments check for anomalies every two minutes. During that window, the sensor 101 will generate 12 data points. However, the threshold from FIG. 3 was generated from four days of data in one embodiment, or 34,560 data points. Embodiments will use KDE to create a curve from the 12 data points and compare the curve to the 34,560 data point curve to determine if it is over or under the threshold. However, in this example, since 12 points is substantially smaller than 34,560 points, false positives may more likely be generated. Therefore, embodiments must determine the minimum number of points in the window that are needed to be compared to the 34,560 points (i.e., the number of points used to determine the threshold) to reduce or eliminate false positives, and if the number of points is below the minimum, embodiments add "clean" points to the input points to improve anomaly detection.

Therefore, when detecting anomalies using KDE in combination with KL divergence, using the threshold value from FIG. 3 entails using a trained algorithm with large amounts of data. In contrast, in embodiments, when evaluating incoming data, and comparing the complete probability distribution function ("PDF") of training data (i.e., a large dataset) with the PDF of incoming data (i.e., a relatively very small dataset) does not always generate accurate results. Therefore, FIG. 4 functionality assists in identifying anomalies while comparing relatively small input data with a trained PDF by determining a minimum window size (i.e., a minimum number of data points in the window).

At 401, the evaluation dataset from 306 of FIG. 3 and the threshold value is received. The evaluation dataset is formed of the 20% of the data input in 302 that was not used for determining the threshold. As with the entire initial dataset received at 302, the evaluation dataset at 401 is free of anomalies (i.e., "clean" data).

At 402, the evaluation dataset is divided into segments. When the input data has a cyclic pattern, then the input is divided into "n" equal segments, where the length of each segment is equal to the length of the cycle. If no cyclic pattern, then the input dataset is divided into 20 points each in one embodiment. However, in other embodiments any predefined number besides 20 can be used.

At 404, for each segment at 402, each segment is "scored" similar to 314 and 316 of FIG. 3 to arrive at a KL divergence value for each segment. The number of segments having a divergence value less than the threshold value is determined.

At 406, it is determined if 90% or greater of the segments have an identified KL divergence value less than the threshold value. However, in other embodiments any predefined percentage besides 90% can be used.

If no at 406, then at 407 the window size is increased. In one embodiment, the window size is increased by reducing the number of segments by doubling the number of points in each segment (i.e., increasing the window size). Functionality continues at 404.

If no at 406, and if at 409 the number of points in each segment is less than 10% of the input, then the training fails. The training may fail, for example, if there is too much variation in the data. Consequently, a solution may be to try again with more data (e.g., use 5 days of clean data instead of 4 days).

If yes at 406, then the threshold value from FIG. 3 (or the received threshold value from another source), and the minimum number of input points is saved. The final number of points are considered as the minimum input points required in incoming input while scoring. Further, in embodiments, while scoring if the input size is less than minimum, the saved points are added to the input and then the complete window is scored as described in FIG. 5 below. This does not disturb the distribution as the points that are saved are from the anomalous free data and is expected to be normal in the distribution.

As an example of the functionality of FIG. 4, if the evaluation dataset has 500 points, the input is divided into 25 segments that include 20 points each. Then each segment is scored and each score returns a KL divergence value. From the list of 25 KL divergence values, if 90% of values (i.e., 23 in this example) has an identified divergence less than the calculated "Threshold", the minimum window size is considered to be 20. If it does not satisfy the 90% criteria, the number of points is doubled for each segment. Therefore, in this example, the 500 points are divided into 13 segments approximately with 40 points each and the same evaluation step is repeated.

Figure 5:
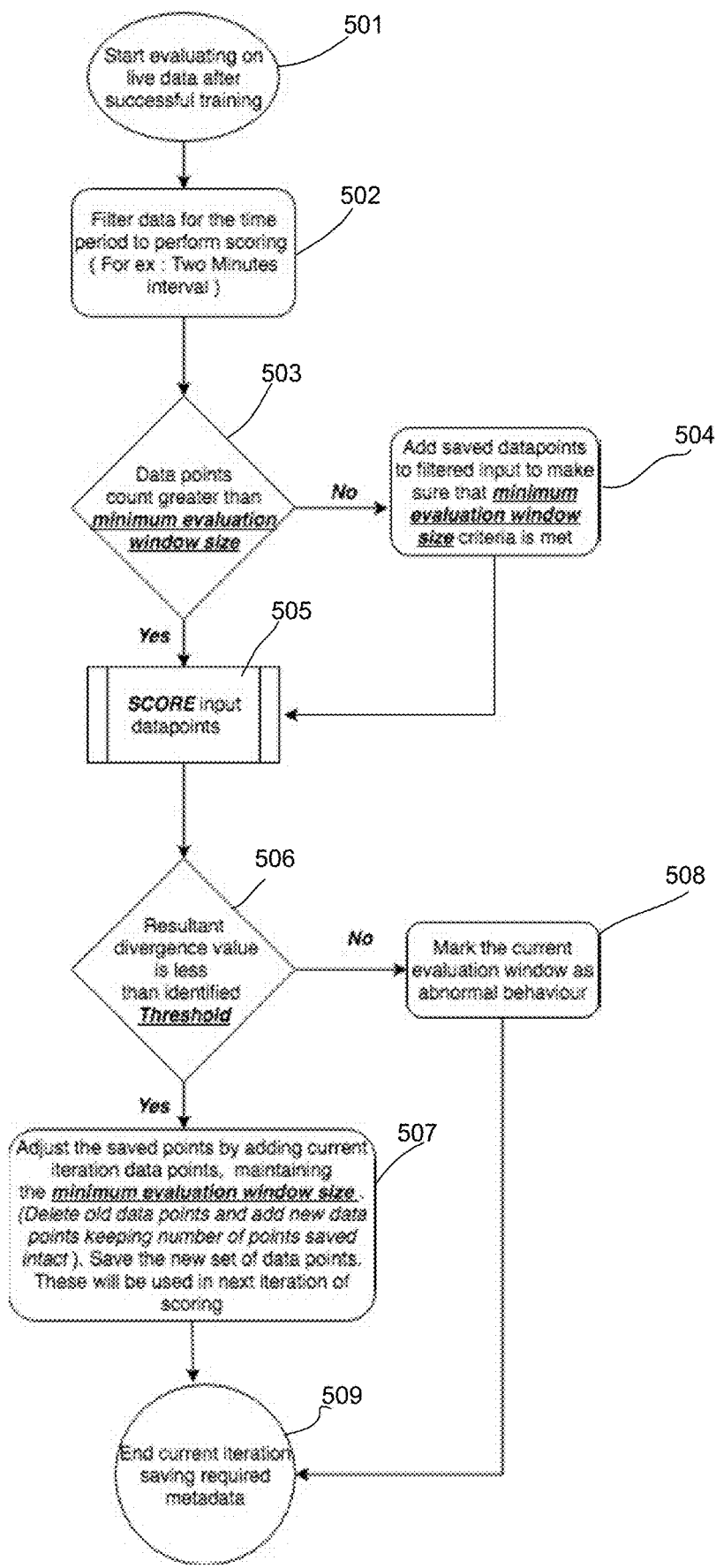
FIG. 5 is a flow diagram of the functionality of the anomaly detection module of FIG. 2 for determining anomalies in live data after the functionality of FIG. 3 and/or FIG. 4 has been completed in accordance with one embodiment.

FIG. 5 is a flow diagram of the functionality of anomaly detection module 16 of FIG. 2 for determining anomalies in live data after the functionality of FIG. 3 and/or FIG. 4 has been completed in accordance with one embodiment. The functionality of FIG. 5 is repeated for a pre-defined time window of data points generated by a single sensor 101. For example, a two minute time window.

At 501, evaluation on live data (i.e., at runtime) is started. In embodiments, each of sensors 101 generates live data in the form of a stream of messages.

At 502, the data is filtered to a pre-defined time period. For example, the pre-defined time period may be a two minute window of data points/messages from a single sensor 101, which may produce 40 data points.

At 503, it is determined if the data points count in the window is greater than the minimum evaluation window count (e.g., 80 points) determined in FIG. 4.

At 504, if there are not enough data points in the filtered input (e.g., 40 is less than 80), saved "clean" data points are added to make sure the minimum number of data points are achieved. In embodiments, the clean data points may be the most recent 20% data points that were used at 401 of FIG. 4.

At 505, the input data points (including the added data points if necessary) are "scored" by using KDE to mathematically generate a curve of the input data points and determining the KL divergence value in comparison to the KDE curve generated from 80% clean data from 306.

At 506, it is determined if the KL divergence value from 505 is less than the identified threshold value. If no, at 508 then the current window includes abnormal anomalous behavior.

If yes at 506, then the data points in the current time window are "clean" (i.e., no anomalies).

At 507, the "saved" data points are adjusted by adding the current iteration data points while maintaining the minimum window size. For example, if the number of saved data points was 80 points and the current window size is 40 points, then the most recent 40 points of the saved data points is used with the current window 40 points. This new set of saved data points is used in the next iteration, so that functionality continues at 502 for the next window of data points.

At 509, the current iteration is ended and the required metadata is saved. The metadata includes the KDE of the 80% clean data points, the threshold, etc.

As disclosed, embodiments determine whether a window of sensor data includes anomalies using KDE and KL divergence by determining a KL divergence threshold and further determining a minimum window size, and then supplementing an incoming window of data with anomalous free data, if necessary, to meet the minimum window size.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of determining anomalies in sensor data generated by a sensor, the method comprising:
   (a) receiving an evaluation time window of clean sensor data generated by the sensor, the clean sensor data comprising anomaly free data as a plurality of data points, the anomaly free data comprising data points that reflect an expected behavior of a respective sensor;
   (b) receiving a threshold value for determining anomalies and determining if the clean sensor data comprises a cyclic pattern comprising a repeating pattern;
   (c) when the clean sensor data has a cyclic pattern, dividing the evaluation time window into a plurality of segments of equal length, wherein each equal length comprises the cyclic pattern;
   (d) when the clean sensor data does not have the cyclic pattern, dividing the evaluation time window into a pre-defined number of plurality of segments of equal length;
   (e) converting the evaluation time window and each of the plurality of segments into corresponding curves using Kernel Density Estimation (KDE);
   (f) for each of the plurality of segments, determining a Kullback-Leibler (KL) divergence value between corresponding curves of the segment and the evaluation time window to generate a plurality of KL divergence values;
   (g) determining an amount of the plurality of segments that have a KL divergence value less than the threshold value; and
   (h) when the amount is less than a pre-defined percentage of the plurality of segments, reducing a number of segments to increase a number of data points in each segment, and for the reduced number of segments, repeating (f)-(h).

2. The method of claim 1, further comprising:
when the amount is greater than the pre-defined percentage of the plurality of segments, then a current size of each segment is a minimum window size for determining anomalies in sensor data generated by the sensor, the minimum window size comprising a minimum data points for the threshold value.

3. The method of claim 2, further comprising:
receiving a first time window of second clean sensor data generated by the sensor, the second clean sensor data comprising anomaly free data;
receiving a second time window of live sensor data generated by the sensor;
converting the second time window into a corresponding second curve using KDE;
determining a second KL divergence value between the second curve and the corresponding curve of the first time window to generate a new KL divergence value; and
based on a comparison between the new KL divergence value and the threshold value, determining when the second time window includes anomalies.

4. The method of claim 3, further comprising:
determining whether the second time window is less than the minimum window size; and
adding additional clean data to the second time window before generating the new KL divergence value when the second time window is less than the minimum window size.

5. The method of claim 1, further comprising:
when the amount is less than a pre-defined percentage of the plurality of segments, and a current number of data points in each segment is greater than a pre-defined percentage of the plurality of data points, ending the method and failing a minimum window size determination for the threshold value.

6. The method of claim 1, wherein the pre-defined number of plurality of segments of equal length comprises each of the plurality of segments including 20 data points, and the pre-defined percentage of the plurality of segments comprises 90%, and the cyclic pattern comprises a sine wave.

7. The method of claim 1, the determining the KL divergence value comprising generating a plurality of samples of each curve comprising random sampling with a Gaussian distribution.

8. The method of claim 1, wherein the evaluation time window of clean sensor data comprises a time series of data points, each data point generated by the sensor at a fixed time interval.

9. The method of claim 1, further comprising generating the threshold value comprising:
receiving a first time window of second clean sensor data generated by the sensor, the second clean sensor data comprising anomaly free data;
when the second clean sensor data has the cyclic pattern, dividing the first time window into a second plurality of segments of equal length, wherein each equal length comprises the cyclic pattern;
when the second clean sensor data does not have the cyclic pattern, dividing the first time window into a pre-defined number of plurality of segments of equal length;
converting the first time window and each of the plurality of segments into corresponding curves using KDE;
for each of the second plurality of segments, determining the KL divergence value between corresponding curves of the segment and the first time window to generate a plurality of second KL divergence values; and
determining the threshold value based on a mean and a standard deviation of the second KL divergence values.

10. A non-transitory computer-readable medium storing instructions which, when executed by at least one of a plurality of processors, cause the processor to determine anomalies in sensor data generated by a sensor, the determining anomalies comprising:
(a) receiving an evaluation time window of clean sensor data generated by the sensor, the clean sensor data comprising anomaly free data as a plurality of data points; the anomaly free data comprising data points that reflect an expected behavior of a respective sensor;
(b) receiving a threshold value for determining anomalies and determining if the clean sensor data comprises a cyclic pattern comprising a repeating pattern;
(c) when the clean sensor data has a cyclic pattern, dividing the evaluation time window into a plurality of segments of equal length, wherein each equal length comprises the cyclic pattern;
(d) when the clean sensor data does not have the cyclic pattern, dividing the evaluation time window into a pre-defined number of plurality of segments of equal length;
(e) converting the evaluation time window and each of the plurality of segments into corresponding curves using Kernel Density Estimation (KDE);
(f) for each of the plurality of segments, determining a Kullback-Leibler (KL) divergence value between corresponding curves of the segment and the evaluation time window to generate a plurality of KL divergence values;
(g) determining an amount of the plurality of segments that have a KL divergence value less than the threshold value; and
(h) when the amount is less than a pre-defined percentage of the plurality of segments, reducing a number of segments to increase a number of data points in each segment, and for the reduced number of segments, repeating (f)-(h).

11. The computer-readable medium of claim 10, the determining anomalies further comprising:
when the amount is greater than the pre-defined percentage of the plurality of segments, then a current size of each segment is a minimum window size for determining anomalies in sensor data generated by the sensor, the minimum window size comprising a minimum data points for the threshold value.

12. The computer-readable medium of claim 11, the determining anomalies further comprising:
receiving a first time window of second clean sensor data generated by the sensor, the second clean sensor data comprising anomaly free data;
receiving a second time window of live sensor data generated by the sensor;
converting the second time window into a corresponding second curve using KDE;
determining a second KL divergence value between the second curve and the corresponding curve of the first time window to generate a new KL divergence value; and
based on a comparison between the new KL divergence value and the threshold value, determining when the second time window includes anomalies.

13. The computer-readable medium of claim 12, the determining anomalies further comprising:
- determining whether the second time window is less than the minimum window size; and
- adding additional clean data to the second time window before generating the new KL divergence value when the second time window is less than the minimum window size.

14. The computer-readable medium of claim 10, the determining anomalies further comprising:
- when the amount is less than a pre-defined percentage of the plurality of segments, and a current number of data points in each segment is greater than a pre-defined percentage of the plurality of data points, ending the determining anomalies and failing a minimum window size determination for the threshold value.

15. The computer-readable medium of claim 10, wherein the pre-defined number of plurality of segments of equal length comprises each of the plurality of segments including 20 data points, and the pre-defined percentage of the plurality of segments comprises 90%%, and the cyclic pattern comprises a sine wave.

16. The computer-readable medium of claim 10, the determining the KL divergence value comprising generating a plurality of samples of each curve comprising random sampling with a Gaussian distribution.

17. The computer-readable medium of claim 10, wherein the evaluation time window of clean sensor data comprises a time series of data points, each data point generated by the sensor at a fixed time interval.

18. The computer-readable medium of claim 10, the determining anomalies further comprising generating the threshold value comprising:
- receiving a first time window of second clean sensor data generated by the sensor, the second clean sensor data comprising anomaly free data;
- when the second clean sensor data has the cyclic pattern, dividing the first time window into a second plurality of segments of equal length, wherein each equal length comprises the cyclic pattern;
- when the second clean sensor data does not have the cyclic pattern, dividing the first time window into a pre-defined number of plurality of segments of equal length;
- converting the first time window and each of the plurality of segments into corresponding curves using KDE;
- for each of the second plurality of segments, determining the KL divergence value between corresponding curves of the segment and the first time window to generate a plurality of second KL divergence values; and
- determining the threshold value based on a mean and a standard deviation of the second KL divergence values.

19. A sensor network comprising:
- a plurality of sensors configured to generate sensor data; and
- an anomaly detector coupled to the plurality of sensors via a communication network and comprising one or more processors that determine, for each of the plurality of sensors, anomalies in the sensor data, the anomaly detector configured to:
- (a) receive an evaluation time window of clean sensor data generated by the sensor, the clean sensor data comprising anomaly free data as a plurality of data points, the anomaly free data comprising data points that reflect an expected behavior of a respective sensor;
- (b) receive a threshold value for determining anomalies and determine if the clean sensor data comprises a cyclic pattern comprising a repeating pattern;
- (c) when the clean sensor data has a cyclic pattern, divide the evaluation time window into a plurality of segments of equal length, wherein each equal length comprises the cyclic pattern;
- (d) when the clean sensor data does not have the cyclic pattern, divide the evaluation time window into a pre-defined number of plurality of segments of equal length;
- (e) convert the evaluation time window and each of the plurality of segments into corresponding curves using Kernel Density Estimation (KDE);
- (f) for each of the plurality of segments, determine a Kullback-Leibler (KL) divergence value between corresponding curves of the segment and the evaluation time window to generate a plurality of KL divergence values;
- (g) determine an amount of the plurality of segments that have a KL divergence value less than the threshold value; and
- (h) when the amount is less than a pre-defined percentage of the plurality of segments, reduce a number of segments to increase a number of data points in each segment, and for the reduced number of segments, repeat (f)-(h).

20. The sensor network of claim 19, the anomaly detector further configured to:
- when the amount is greater than the pre-defined percentage of the plurality of segments, then a current size of each segment is a minimum window size for determining anomalies in sensor data generated by the sensor, the minimum window size comprising a minimum data points for the threshold value.

* * * * *

UNITED STATES PATENT AND TRADEMARK OFFICE
CERTIFICATE OF CORRECTION

| | |
|---|---|
| PATENT NO. | : 11,526,790 B2 |
| APPLICATION NO. | : 16/585764 |
| DATED | : December 13, 2022 |
| INVENTOR(S) | : Karthik et al. |

It is certified that error appears in the above-identified patent and that said Letters Patent is hereby corrected as shown below:

On the Title Page

On page 2, Column 2, under Other Publications, Line 14, delete ""SOMKE" and insert -- "SMOKE --, therefor.

On page 2, Column 2, under Other Publications, Line 17, delete "somke" and insert -- smoke --, therefor.

In the Specification

In Column 7, Line 40, delete "ρ" and insert -- p --, therefor.

In the Claims

In Column 12, Line 15, in Claim 10, delete "points;" and insert -- points, --, therefor.

In Column 13, Line 22, in Claim 15, delete "90%%" and insert -- 90% --, therefor.

Signed and Sealed this
Fifteenth Day of August, 2023

Katherine Kelly Vidal
*Director of the United States Patent and Trademark Office*